US010768611B2

(12) United States Patent
Norman et al.

(10) Patent No.: US 10,768,611 B2
(45) Date of Patent: Sep. 8, 2020

(54) COUNTER AND TIMER CONSTRAINTS

(75) Inventors: David Everton Norman, Bountiful, UT (US); Andrew Charles Carson, Reading (GB)

(73) Assignee: Applied Materials, Inc., Santa Clara, CA (US)

( * ) Notice: Subject to any disclaimer, the term of this patent is extended or adjusted under 35 U.S.C. 154(b) by 1166 days.

(21) Appl. No.: 12/816,322

(22) Filed: Jun. 15, 2010

(65) Prior Publication Data
US 2011/0029984 A1 Feb. 3, 2011

Related U.S. Application Data

(60) Provisional application No. 61/187,579, filed on Jun. 16, 2009.

(51) Int. Cl.
G05B 19/418 (2006.01)
G06Q 10/06 (2012.01)
(52) U.S. Cl.
CPC ....... G05B 19/41865 (2013.01); G06Q 10/06 (2013.01); *G05B 2219/32396* (2013.01); *G05B 2219/45031* (2013.01); *G06Q 10/06312* (2013.01); *G06Q 10/06316* (2013.01); *Y02P 90/20* (2015.11)
(58) Field of Classification Search
None
See application file for complete search history.

(56) References Cited

U.S. PATENT DOCUMENTS

| | | | | |
|---|---|---|---|---|
| 5,341,302 A * | 8/1994 | Connors et al. | ............. | 700/102 |
| 5,819,232 A * | 10/1998 | Shipman | ...................... | 705/7.24 |
| 5,983,195 A * | 11/1999 | Fierro | .......................... | 705/7.22 |
| 6,182,049 B1 * | 1/2001 | Barker | ............. | G05B 19/41865 700/109 |
| 6,427,090 B1 * | 7/2002 | Federico | ............ | G05B 19/4187 700/100 |
| 6,519,498 B1 * | 2/2003 | Jevtic et al. | .................. | 700/101 |
| 7,027,885 B1 * | 4/2006 | Barto | ..................... | G06Q 50/04 700/121 |
| 7,043,318 B1 * | 5/2006 | Barto | ..................... | G06N 5/043 700/100 |

(Continued)

FOREIGN PATENT DOCUMENTS

JP 10225848 A * 8/1998 ............. B23Q 41/08
WO PCT/US2010/038891 6/2010

OTHER PUBLICATIONS

Volsem, "An Evolutionary Algorithm and discrete event simulation for optimizing inspection strategies for multi-stage processes," 2007, European Journal of Operational Research, vol. 179, pp. 621-633.*

(Continued)

*Primary Examiner* — Ivan R Goldberg
(74) *Attorney, Agent, or Firm* — Patterson + Sheridan, LLP

(57) ABSTRACT

A method and system for scheduling tasks using a counter constraint. A method may include identifying multiple tasks to be performed, receiving dependency data indicating that scheduling of at least one task is dependent on whether a counter satisfies a threshold in relation to an additional condition, and upon determining, during scheduling, that the counter satisfies the threshold in relation to the additional condition, triggering a scheduling action with respect to at least one task.

20 Claims, 10 Drawing Sheets

(56) References Cited

U.S. PATENT DOCUMENTS

| | | | |
|---|---|---|---|
| 7,054,702 B1* | 5/2006 | Barto | G05B 19/41865 |
| | | | 700/100 |
| 2003/0120466 A1* | 6/2003 | Liu et al. | 702/188 |
| 2004/0092045 A1* | 5/2004 | Bultman et al. | 438/16 |
| 2004/0158831 A1 | 8/2004 | Katsushige et al. | |
| 2004/0261037 A1 | 12/2004 | Ording et al. | |
| 2004/0261038 A1 | 12/2004 | Ording et al. | |
| 2004/0262290 A1* | 12/2004 | Haanstra | H01L 21/67276 |
| | | | 219/490 |
| 2005/0015504 A1* | 1/2005 | Dorne et al. | 709/229 |
| 2005/0096770 A1* | 5/2005 | Chua et al. | 700/102 |
| 2005/0097012 A1 | 5/2005 | Tomohiko | |
| 2005/0154625 A1* | 7/2005 | Chua | G06Q 10/06 |
| | | | 700/100 |
| 2006/0184264 A1* | 8/2006 | Willis | G05B 19/4184 |
| | | | 700/108 |
| 2007/0168318 A1* | 7/2007 | Burda | G03F 7/70741 |
| 2008/0062414 A1* | 3/2008 | Chen | G03F 1/82 |
| | | | 356/237.1 |
| 2009/0150891 A1 | 6/2009 | Emanuel et al. | |
| 2009/0183162 A1 | 7/2009 | Kindel et al. | |

OTHER PUBLICATIONS

International Preliminary Report on Patentability for PCT/US2010/038891 dated Dec. 29, 2011, 4 pages.
Global Constraint Catalog: Producer-consumer, http://www.emn.fr/z-info/sdemasse/gccat/Kproducter-consumer.html, Dec. 6, 2010, 1 page.

* cited by examiner

COUNTER AND TIMER CONSTRAINTS

RELATED APPLICATIONS

This application claims the benefit of U.S. Provisional Application No. 61/187,579, filed on Jun. 16, 2009.

TECHNICAL FIELD

Embodiments of the present invention relate to scheduling generally, and more particularly, to scheduling one or more tasks using a counter constraint.

BACKGROUND OF THE INVENTION

Constraint programming can be used in a wide variety of constraint problems including job shop and flow shop scheduling, where a scheduling problem involves time and/or value restrictions placed in scheduling the tasks. Constraint programming can be used to find a solution which can satisfy all of the constraints. Constraint programming includes a set of search variables, domains that set boundaries for the possible values for each of the variables, and a set of constraints. Typical scheduling problems involve creating two search variables for each task: one variable to represent the equipment that can process a task and another variable to represent the start time for the task. Unfortunately, the typical creation of two search variables provides limited capability for modeling common situations. For example, if an industrial engineer wishes to limit the production of a product during the first twelve hours of a day, the current state of the art does not provide a general constraint to place a restriction when creating a manufacturing schedule. Rather, an industrial engineer has to do it from scratch using basic tools of constraint programming.

BRIEF DESCRIPTION OF THE DRAWINGS

The present invention is illustrated by way of example, and not by way of limitation, in the figures of the accompanying drawings and in which.

DETAILED DESCRIPTION

Embodiments of the invention are directed to a method and system for scheduling tasks using a counter. A scheduling system identifies multiple tasks to be performed. The scheduling system receives dependency data indicating that scheduling of at least one task is dependent on whether a counter value satisfies a threshold in relation to an additional condition (e.g., a specified time is reached or a specified change in the state of at least one task has occurred). During task operation, the scheduling system periodically determines whether the counter value satisfies the threshold in relation to the additional condition. If so, the scheduling system triggers a scheduling action (e.g., starting a task, completing a task, pausing a task, resuming a task, etc.) with respect to at least one task.

Figure 1A:
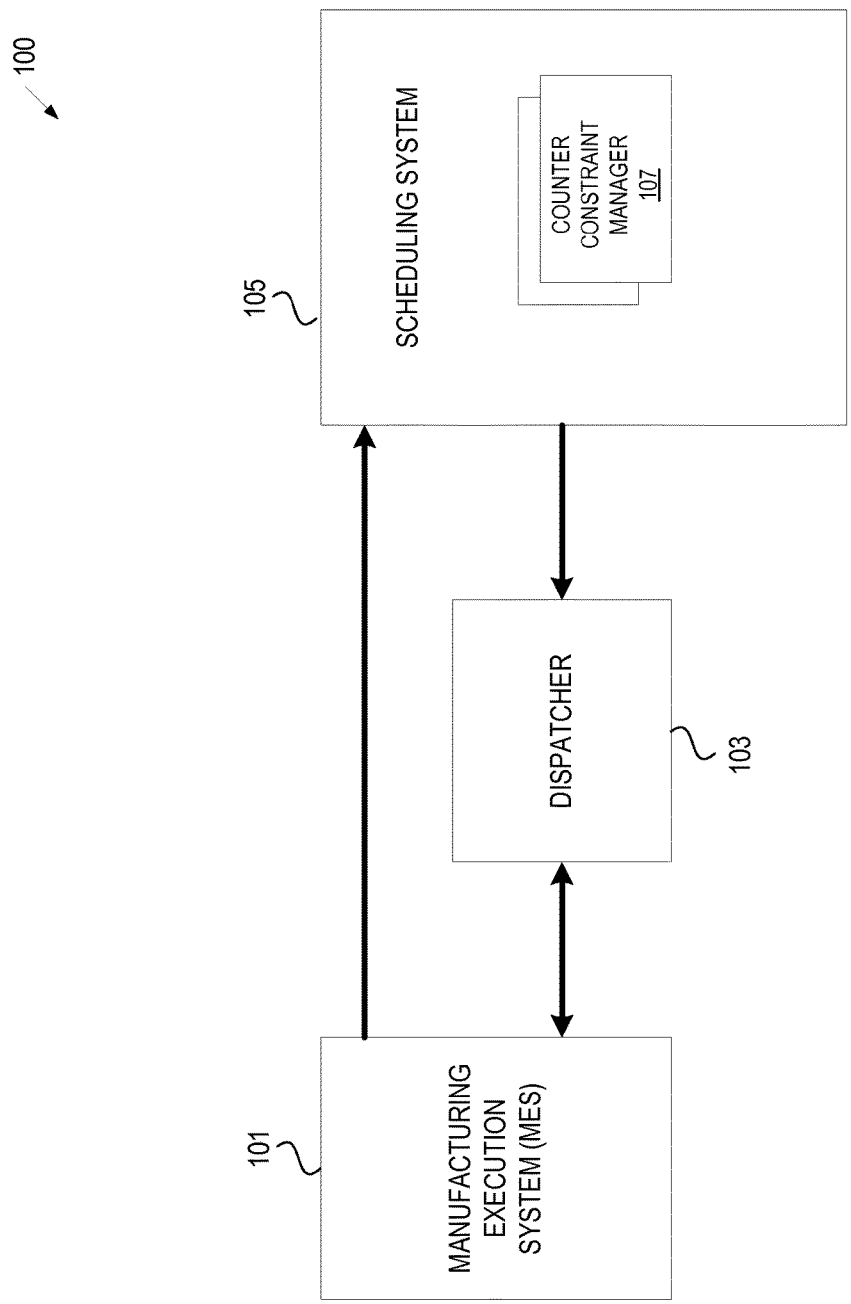
FIG. 1A is a block diagram illustrating a scheduling system utilizing a counter constraint.

FIG. 1A is a block diagram illustrating a manufacturing system 100 including a scheduling system 105 that utilizes one or more counter constraints 107. Manufacturing system 100 can include a fabrication system data source (e.g., manufacturing execution system (MES) 101), a dispatcher 103, and a scheduling system 105. The MES 101, dispatcher 103, and scheduling system 105 can be individually hosted by any type of computing device including server computers, desktop computers, laptop computers, handheld computers or similar computing device. Alternatively, a combination of MES 101, dispatcher 103, and scheduling system 105 can be hosted on a single computing device including server computers, desktop computers, laptop computers, handheld computers or similar computing device. The scheduling system 105 obtains data reflecting a current state of the factory. For example, the scheduling system 105 can receive data identifying tasks to be performed and possible start times for each task. In one embodiment, the scheduling system 105 is coupled to a factory system data source (e.g., MES 101, Enterprise Resource Planning (ERP) system, etc.) to receive lot and equipment status data. In one embodiment, scheduling system 105 can include a graphical user interface (GUI) generator 111 to create and provide a user interface 109 (e.g., GUI) to a user (e.g., an industrial engineer). User interface 109 can receive data from a user identifying tasks to be performed and data indicating the restrictions to place in a schedule for performing the tasks.

The scheduling system 105 uses the data to provisionally schedule the times for various tasks to be performed. The scheduling system 105 can create and use constraints, including one or more counter constraints, to place restrictions in scheduling the tasks. In one embodiment, the scheduling system 105 includes a counter constraint manager 107 that uses a new programming constraint referred to as a counter constraint for placing a time and/or value restriction in scheduling tasks. The counter constraint manager 107 can determine the value of a counter periodically and/or at a specific point in time. In one embodiment, the scheduling system 105 provides user interface (e.g., a graphical user interface) to enable a user (e.g., an industrial engineer) to model a provisional schedule utilizing a counter constraint. The provisional schedule and any data related to the provisional schedule are provided to constraint managers, including the counter constraint manager 107. The constraint managers perform updates based on the provisional schedule. Additional provisional scheduling may be performed and additional updates may be performed until an entire schedule is constructed. The scheduling system 105 can provide the entire schedule to a dispatcher 103. The dispatcher 103 can be integrated through the MES 101 to dispatch, for example, wafer lots accordingly.

Figure 1B:
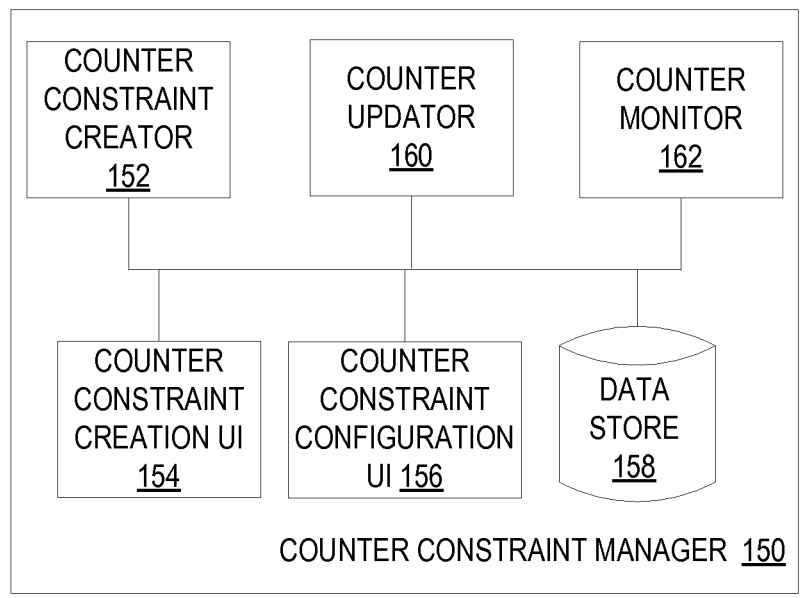
FIG. 1B is a block diagram of one embodiment of a counter constraint manager.

FIG. 1B illustrates a block diagram of one embodiment of a counter constraint manager 150 executing on an exemplary computing environment. Computing environment can be implemented as a server, client, workstation, desktop, tablet, or any other machine. It can also be implemented in one or more small portable platforms such as a notebook, a PDA (personal digital assistant), or wireless web devices, and other devices. The counter constraint manager 150 can be part of a scheduling system (e.g., scheduling system 105 of FIG. 1A) and can include a counter constraint creator 152, a counter constraint creation user interface (UI) 154, a counter constraint configuration UI 156, a data store 158, a counter updator 160 and a counter monitor 162.

The counter constraint creator 152 creates one or more counter constraints for tasks to be performed. As will be discussed in more detail below, a counter constraint can be task specific (e.g., constraining a specific ask), general (e.g., constraining all tasks), or a combination of both (e.g., constraining all tasks in one way and constraining a specific task(s) in a different way). A counter constraint is based on a counter and can be created using an initial value of the counter, a set of updates for the counter and a set of restrictions imposed on the counter. An update can be associated with an action that describes how the counter should be updated and the time of the update. A task may be tied to one or more updates (e.g., via the task's start or end time), or it may not be tied to any updates. A restriction provides limitations to be imposed on the counter. A restriction can be a general restriction that imposes a threshold limitation on the counter for all the tasks, or a task specific restriction that imposes a threshold limitation on the counter for a specific task. A task specific condition can be tied to a task via, for example, the task's start or end time). Each task may be associated with one or more restrictions.

A counter constraint creation UI 154 can receive data defining tasks to be performed and data defining a plurality of variables for each task and a domain for each variable. Task variables may include task state variables (e.g., task start, task end, task pause, task resume, etc.), task equipment variables, etc. A domain for a variable defines allowed values for that variable. The counter constraint creation UI 154 can also receive the initial value of the counter, a set of updates and a set of restrictions. For each update, one or more update parameters may be defined, including for example an update action and an update time. Restriction parameters may include, for example, a restriction value and a restriction time.

In one embodiment, the counter constraint creator 152 includes a programming tool (not shown) to define counter constraint logic using task variables, domains, updates and constraints. Examples of a programming tool may include tools for programming in Java, C++, Perl and Python. The resulting code can be converted into operable information (e.g., executable file) using a compiler, and stored in the data store 158, which may be hosted by a main memory (not shown) or other data storage device (not shown).

Prior to starting the tasks execution process, a user may configure the counter constraint using the counter constrain configuration UI 156. In particular, the user can provide update data and restriction (or dependency) data. The update data can specify an action for updating the counter (e.g., increment, decrement, set to a value, etc.), and an event that should cause an update (e.g., completion of a task, reaching a certain time, etc.). The restriction data can specify the threshold to which the counter value should be compared and when the comparison should be performed (e.g., when a specific change in the state of a task occurs or a specific time is reached). The above data may be stored in the data store 158 or some other store.

During the tasks execution process, the counter updator 160 monitors various events and determines whether the counter needs to be updated. If so, the counter updator 160 updates the counter according to the update data. The counter monitor 162 periodically determines whether the counter has reached a threshold in relation to an additional condition (e.g., at a specified time or at a specified state of a task). If so, the counter monitor triggers a scheduling action associated with a task (e.g., starting a task, ending a task, pausing a task, resuming a task, etc.).

Accordingly, the use of counter constrains provide significant flexibility for scheduling tasks. Not only can a task be scheduled to start when a counter is below a specific number, but a task can be scheduled to start when the counter is below a specific number and a condition with respect to another task is satisfied (e.g., another task is completed), or the counter is below a specific number at a specified time, or the counter is below a specific number in relation to some other additional condition.

Figure 2:
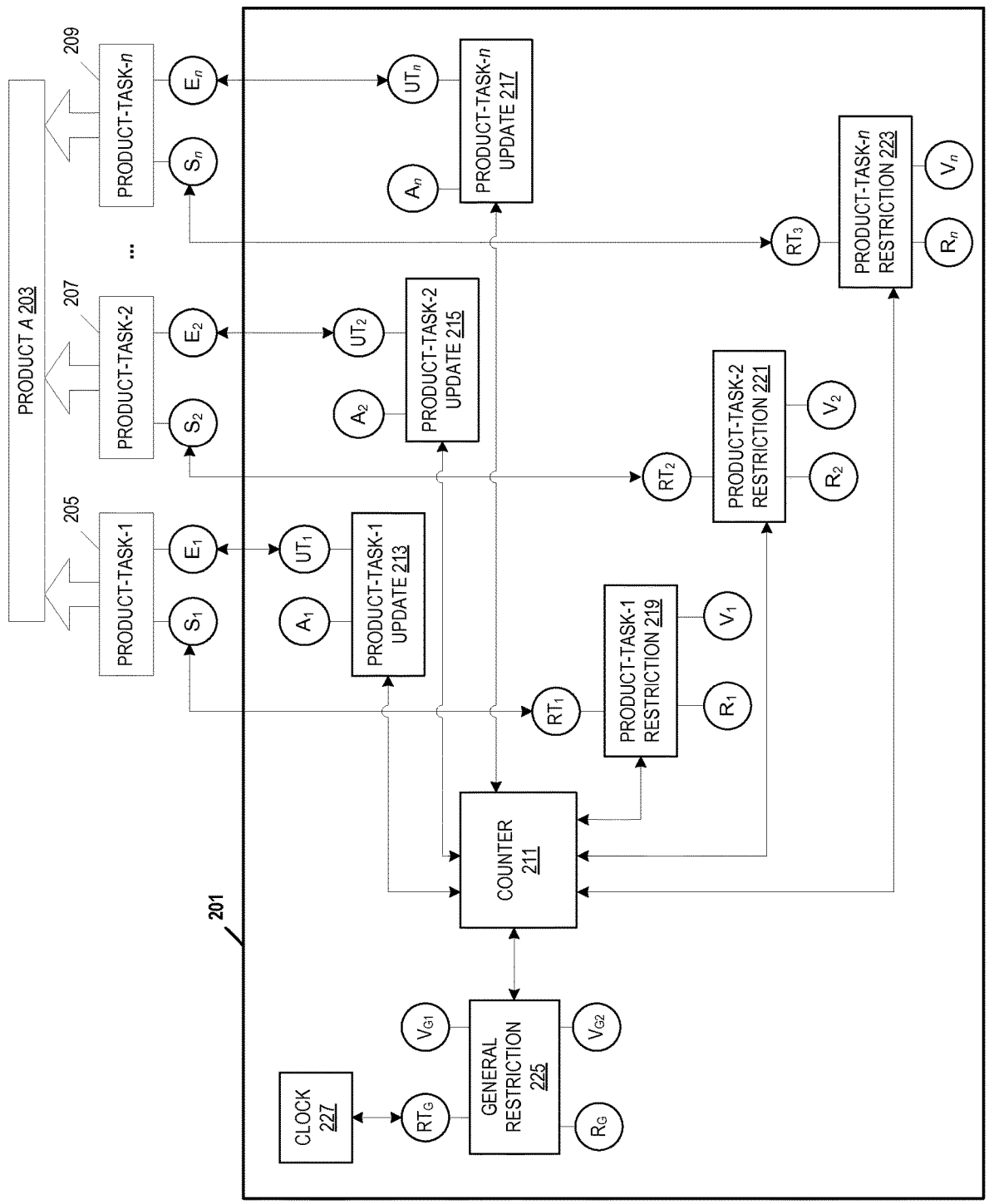
FIG. 2 is a diagram schematically illustrating an example of a scheduling system using a counter constraint for placing a time and value restriction in scheduling tasks.

FIG. 2 schematically illustrates an example of a scheduling system 200 using a counter constraint 201 for placing a time and value restriction in scheduling tasks. A task can be a task used in the manufacturing of semiconductors. Examples of tasks include a task to manufacture product A, a task to use a reticle, a task to inspect a reticle, a task to process a lot of wafers, etc. An example of a counter constraint used to schedule tasks on a reticle and to inspect the reticle is described in greater detail below in conjunction with FIG. 3A. An example of a counter constraint used to schedule tasks to process one or more lots of wafers is described in greater detail below in conjunction with FIG. 4.

Scheduling system 200 uses a counter constraint 201 for scheduling tasks which produce product A (203). The tasks to produce product A (203) are represented by product-task-1 (205), and product-task-2 (207) through product-task-n (209).

Scheduling system 200 is an illustration of placing a general restriction in scheduling tasks. For example, a user (e.g., an industrial engineer) may want no more than 52 of product A (203) to be produced by three o'clock in the afternoon. Counter constraint 201 can model a scenario where at three o'clock in the afternoon, the counter 211 must have a value of less than or equal to 52. In one embodiment, scheduling system 200 provides a graphical user interface enabling a user (e.g., an industrial engineer) to model a scheduling scenario using a counter constraint. In addition, scheduling system 200 can use counter constraint 201 to implement task-specific restrictions which are restrictions associated with a search variable of a task. Using the example above, where no more than 52 of product A (203) may be produced by three o'clock in the afternoon, specific restrictions can be created such that a task that produces product A cannot be performed unless the value of the counter 211 is less than 52. If the counter 211 has a value of greater than or equal to 52, none of the tasks to produce product A will be performed and the search variables' domains are updated to reflect this.

In scheduling system 200, constraint programming search variables are defined for each task (e.g., product-task-1, 2, n). Each product-task (205, 207, 209) has a start time variable ($S_1$, $S_2$, $S_n$) that represents the start time for the task to produce product A (203) and an end time variable ($E_1$, $E_2$, $E_n$) that represents the end time for the task to produce product A (203). Each search variable (e.g., $S_1$, S2, Sn, $E_1$, $E_2$, $E_n$) has a domain (not shown). A domain assigns a set of possible values to a variable. In this way, the values within a domain can become constraints in and of themselves. Domains can be expressed as discrete independent ranges for variables or as expressions which include more than one value.

A counter constraint 201 can be built using a counter 211, a set of updates (213, 215, 217) and a set of restrictions (219, 221, 223, 225). A counter 211 can have a value which can be an integer value. An update (213, 215, 217) affects the value of the counter 211. For example, an update can set the value of the counter to zero, increment the value of the counter by ten, or decrement the value of the counter by an amount (e.g., an integer value). A restriction (219, 221, 223, 225) places a restriction on the scheduling of tasks (e.g., product-task-1, 2 to n) using the counter 211 value. A restriction can be used to place a general restriction in scheduling tasks (e.g., no more than 52 of product A (203) can be produced by three o'clock in the afternoon) and a specific restriction in scheduling a particular task (e.g., a task to produce product A cannot start unless the counter has a value of less than 52).

The counter 211 can have an initial value of zero. In one embodiment, the set of updates (213, 215, 217) includes an update for each product-task (205, 207, 209). In another embodiment, described in greater detail below in conjunction with FIG. 3B, each task does not include an update. Returning to FIG. 2, each update (215, 217, 219) can include an action ($A_1$, $A_2$, $A_n$) to describe how the value of the counter 211 is updated. For example, an update can include an action describing that the value of the counter 211 is incremented by one when a product-task (205, 207, 209) produces product A (203). Each update (213, 215, 217) can also include an update time ($UT_1$, $UT_2$, $UT_n$) associated with the end time variable ($E_1$, $E_2$, $E_n$) of its corresponding product-task to reflect that the counter 211 should be updated when a task 205, 207 or 209 ends.

The set of restrictions (219, 221, 223, 225) includes a general restriction 225 and a restriction (219, 221, 223) for each product-task (205, 207, 209). The general restriction 225 represents the scheduling restriction that at three o'clock in the afternoon the counter 211 must have a value of less than or equal to 52. The restriction (219, 221, 223) for each product-task (205, 207, 209) represents that each task to produce product A cannot be performed unless the counter 211 has a value of less than 52. A restriction can include a restriction time ($RT_1$, $RT_2$, $RT_n$, $RT_G$), relational operator ($R_1$, $R_2$, $R_n$, $R_G$) (e.g., greater than, less than, equal to, etc.), and a restriction value ($V_1$, $V_2$, $V_n$, $V_{G1}$, $V_{G2}$) to describe a restriction imposed on the counter 211.

The general restriction 225 can include a restriction time ($RT_G$) which is associated to a clock 227, a restriction value ($V_{G1}$) representing, for example, three o'clock in the afternoon (e.g., 54,000 seconds), a relational operator ($R_G$) of, for example, "less than or equal to," and a restriction value ($V_{G2}$) of, for example, "52," such that the value of the counter 211 must have a value of less than or equal to, for example, 52 at 3 o'clock in the afternoon. The restriction (219, 221, 223) for each product-task (205, 207, 209) can include a restriction time ($RT_1$, $RT_2$, $RT_n$) which is associated to the start time variable ($S_1$, $S_2$, $S_n$) of the corresponding product-task (205, 207, 209) to reflect the dependency between a task start and the counter value. Each restriction for each product-task can also include a relational operator ($R_1$, $R_2$, $R_n$) of, for example, "less than" and a restriction value ($V_1$, $V_2$, $V_n$) of, for example, "52," such that each product-task (205, 207, 209) cannot start to produce product A (203) unless the counter 211 has a value of less than 52.

Figure 3A:
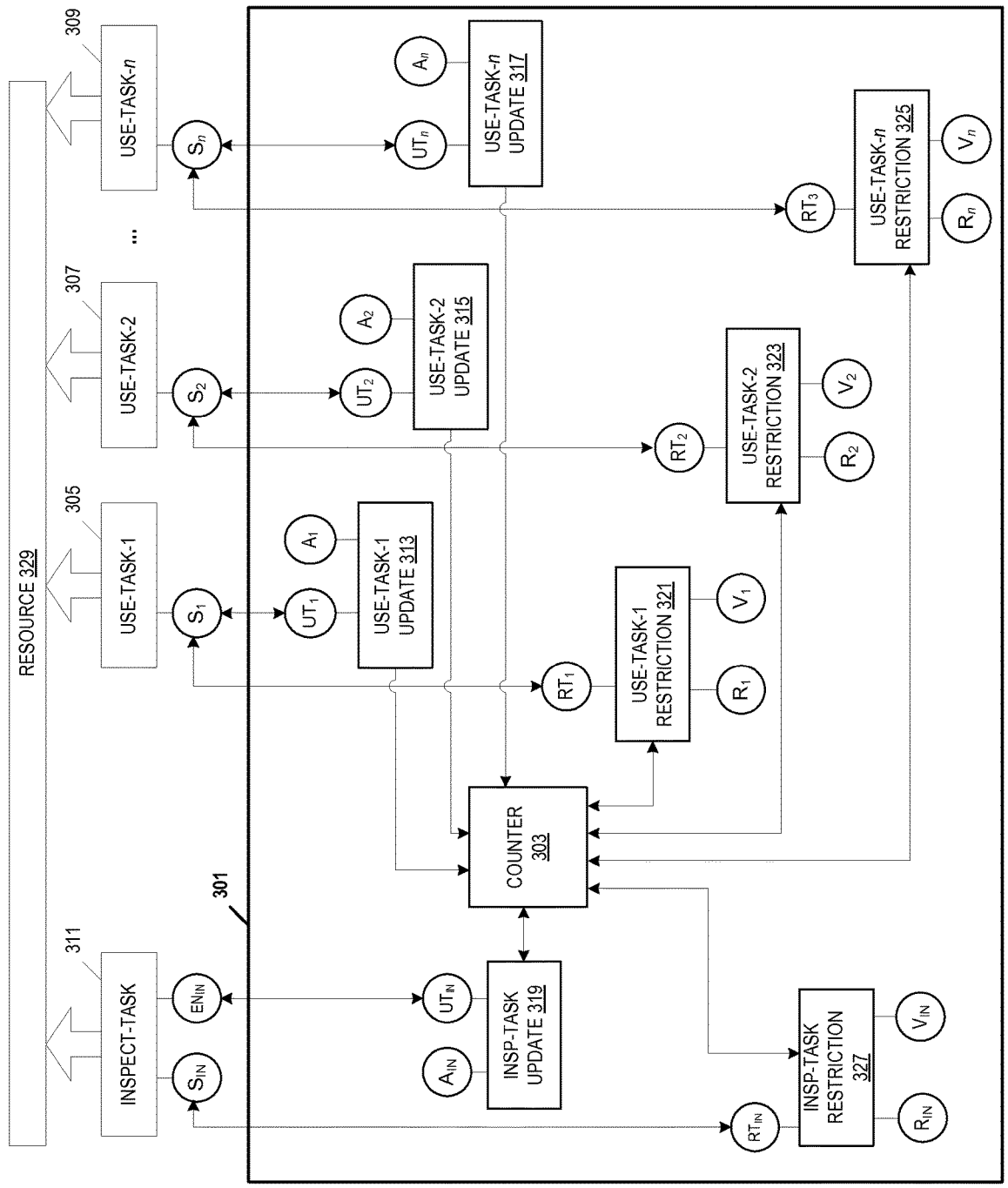
FIG. 3A is a diagram schematically illustrating an example of a scheduling system using a counter constraint for scheduling tasks associated with a resource.

FIG. 3A schematically illustrates an example of a scheduling system 300 using a counter constraint 301 for scheduling tasks associated with a resource 329, according to one embodiment of the invention. A resource can be a resource used in the manufacturing of semiconductors. Semiconductor manufacturing entails the formation of various patterns on wafers and an example of a resource 329 is a reticle, which contains a pattern image for printing directly onto wafers or for printing onto masks that transfer the images onto wafers. A user (e.g., an industrial engineer) may want the reticle to be inspected after the reticle has been used ten times. A task that uses the resource 329 can be represented as a use-task (305, 307, 309) and a task that inspects the resource 329 can be represented as an inspection-task 311.

A counter constraint 301 can model a scenario where an inspection-task 311 can only be performed if the counter 303 has a value that is greater than ten. Likewise, a counter constraint 301 can model the scenario where a use-task (305, 307, 309) can only start if the counter 303 has a value that is less than ten. The industrial engineer may further want additional use-tasks (e.g., use-task-n 309) to resume using the reticle tool 329 after the inspection of the tool is completed. The counter constraint 301 can model a scenario where the value of the counter 303 is reset to zero after the inspection task 311 is completed and thus, a use-task (e.g., use-task-n 309) can start since the counter value is less than ten.

The counter constraint 301 can be built using a counter 303, a set of updates (313, 315, 317, 319), and a set of restrictions (321, 323, 325, 327). The counter 303 can have an initial value of zero. Each use-task (305, 307, 309) has a start time variable ($S_1$, $S_2$, $S_n$) that represents the start time for the task using the resource. In one embodiment, there is an update (313, 315, 317) for each use-task. In another embodiment, described in greater detail below in conjunction with FIG. 3B, each use-task does not include an update. In scheduling system 300, each update can include an action ($A_1$, $A_2$, $A_n$) to describe that the value of the counter 303 is incremented by one each time a use-task (305, 307, 309) uses the resource 329. Update (313, 315, 317) for each use-task can also include an update time ($UT_1$, $UT_2$, $UT_n$) to be associated with the start time ($S_1$, $S_2$, $S_n$) variable of its corresponding use-task.

The set of restrictions (321, 323, 325, 327) includes a restriction for each task (e.g., the inspection-task 311 and each use-task 305,307,309). The restriction (321, 323, 325) for each use-task can include a relational operator ($R_1$, $R_2$, $R_n$) (e.g., "less than") and a restriction value ($V_1$, $V_2$, $V_n$) (e.g., "10"), such that each use-task (305, 307, 309) cannot start to use the reticle 329 unless the counter 303 has a value of less than ten. Restriction for each use-task can also include a restriction time ($RT_1$, $RT_2$, $RT_n$) which is associated to the start time variable ($S_1$, $S_2$, $S_n$) of the corresponding use-task (305, 307, 309).

The inspection-task 311 has a start time variable ($S_N$) that represents the start time of the inspection of the resource 329 and an end-time variable ($EN_{IN}$) that represents the end time of the inspection of the resource. The restriction 327 for the inspection-task 311 can include a relational operator ($R_{IN}$) of "equal to" and a value ($V_{IN}$) of "10," such that the inspection-task 311 does not start to use the reticle 329 unless the counter 303 has a value equal to ten. As such, the restriction 327 for the inspection-task can also include a restriction time ($RT_{IN}$) which is associated to the start time variable ($S_{IN}$) of the inspection-task 311. Where a user (e.g., an industrial engineer) further wants tasks (e.g., use-task-n) to resume using the reticle tool after the inspection completes, the counter constraint 301 can include an update 319 for the inspection-task to reset the value of the counter 303 to zero after the inspection task is completed. The update 319 can include an action ($A_{IN}$) describing that the value of the counter 303 is set to zero and an update time ($UT_{IN}$) associated with the end time ($EN_{IN}$) of the inspection-task 311.

Figure 3B:
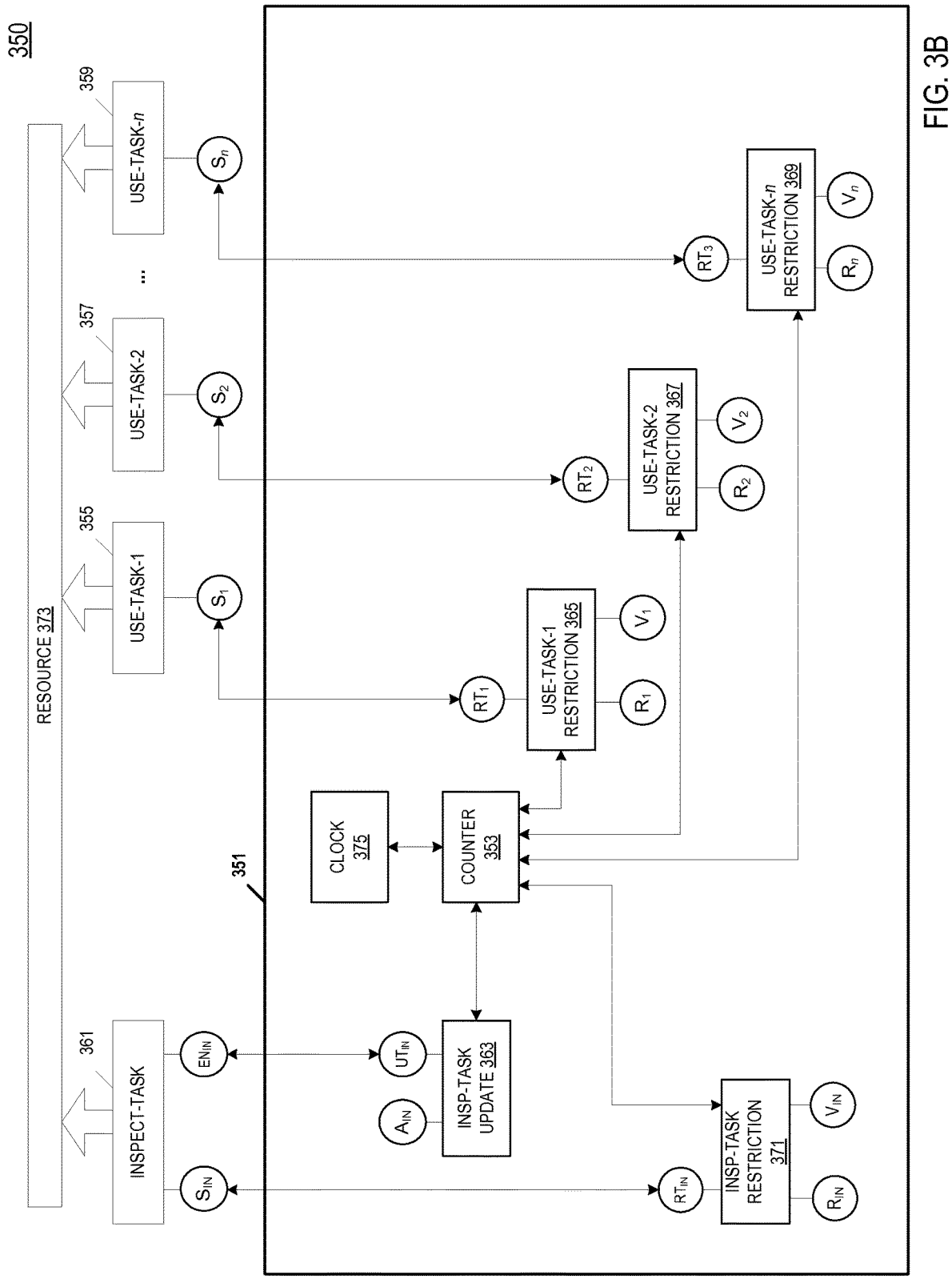
FIG. 3B is a diagram schematically illustrating an example of a scheduling system using a timer constraint for scheduling tasks associated with a resource.

FIG. 3B schematically illustrates an example of a scheduling system 350 using a timer constraint 351 for scheduling tasks associated with a resource 373, according to one embodiment of the invention. In this example, a task is scheduled based on time, rather than a number of uses of the resource. For example, an industrial engineer may want a reticle tool to be inspected after the reticle has been used for 24 hours. In this case, a timer constraint 351 can model a scenario where an inspection-task 363 can only be performed if the value of a counter 353 is greater than 24 hours. In one embodiment, the value of the counter 353 is expressed in seconds. Likewise, a timer constraint 351 models the scenario where a use-task (355, 357, 359) can only start if the value of the counter 353 is less than 24 hours.

The counter 353 can have an initial value of zero. There is a restriction for each task (e.g., the inspection-task 363 and each use-task 355, 357, 359). The restriction (365, 367, 369) for each use-task can include a relational operator ($R_1$, $R_2$, $R_n$) of "less than" and a restriction value ($V_1$, $V_2$, $V_n$) of "86,400" seconds, such that each use-task (355, 357, 359) does not start to use the reticle 373 unless the counter 353 has a value of less than 86,400. As such, each restriction (365, 367, 369) for each use-task can also include a restriction time ($RT_1$, $RT_2$, $RT_n$) which is associated to the start time variable ($S_1$, $S_2$, $S_n$) of the corresponding use-task (265, 267, 269). The restriction 371 for the inspection-task 363 can include a relational operator ($R_{IN}$) of "equal to" and a restriction value ($V_{IN}$) of "86,400" seconds, such that the inspection-task 363 does not start to use the reticle 373 unless the counter 353 has a value equal to 84,600. As such, the restriction 371 for the inspection-task can also include a restriction time ($RT_{IN}$) which is associated to the start time variable ($S_{IN}$) of the inspection-task 363.

With every second that passes by on clock 375, the value of the counter 353 is incremented by one second. Therefore, in this embodiment, each use-task (355, 357, 359) does not include an update to update the counter 353. An update, however, can be included for an inspection-task 363 to reset the value of the counter 353 after the inspection of the reticle is completed. For example, where a user (e.g., an industrial engineer) further wants tasks (e.g., use-task-n) to resume using the reticle tool after the inspection completes, the timer constraint 351 can include an update 363 for the inspection-task to reset the value of the counter 353 to zero after the inspection task is completed. The update 363 can include an action ($A_{IN}$) describing that the value of the counter 353 is set to zero and an update time ($UT_{IN}$) associated with the end time ($EN_{IN}$) of the inspection-task 363.

Figure 4:
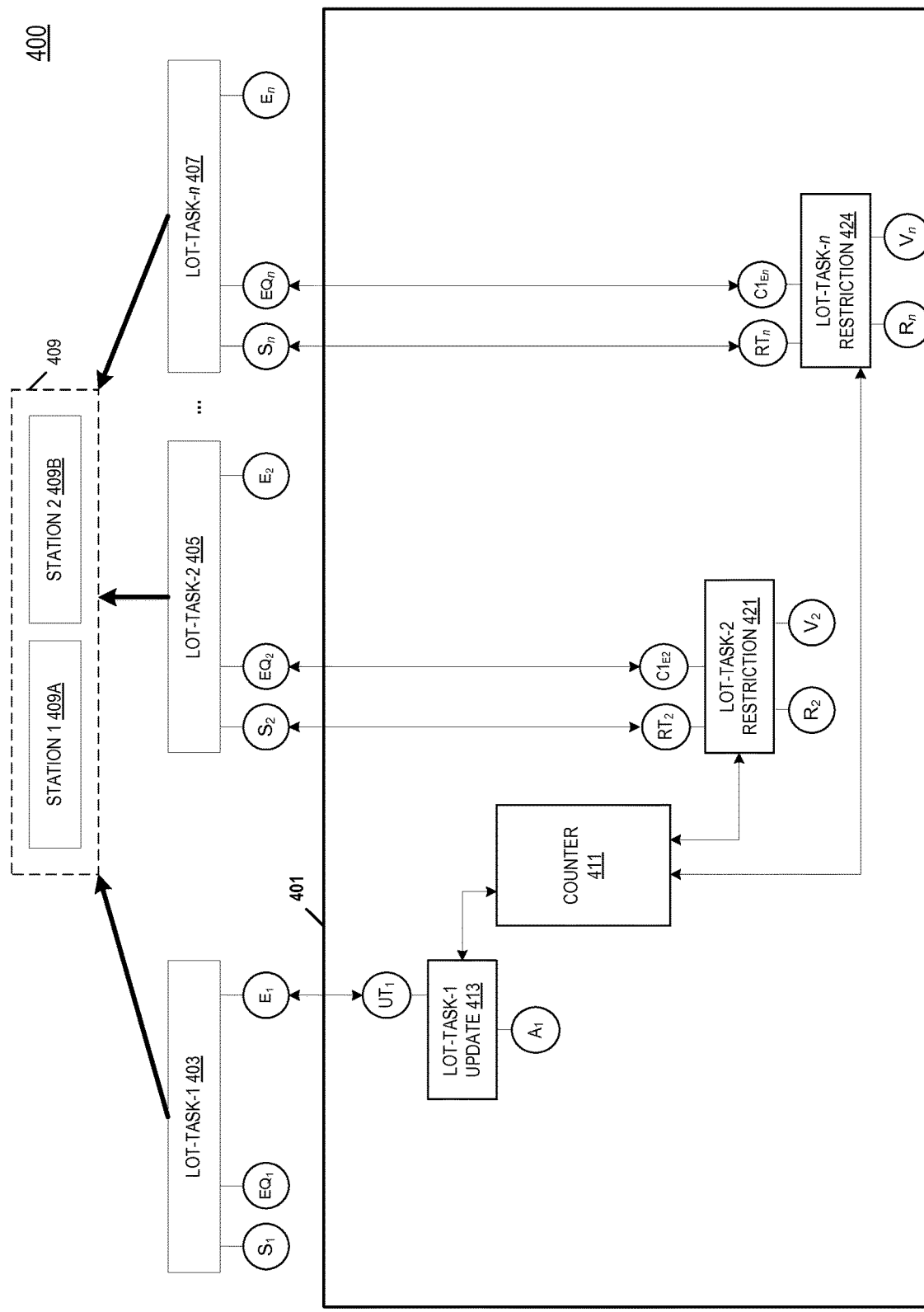
FIG. 4 is a diagram schematically illustrating an example of a scheduling system using a counter constraint for placing scheduling restrictions on some tasks and not other tasks.

FIG. 4 schematically illustrates an example of a scheduling system 400 using a counter constraint 401 for placing scheduling restrictions on some tasks and not other tasks, according to one embodiment of the invention. For example, a user (e.g., an industrial engineer) can schedule one or more lots of wafers to be processed on a station that requires a send-ahead lot and other lots of wafers to be processed on a station that does not require a send-ahead lot. A 'station' can refer to manufacturing equipment, a manufacturing tool, a component of manufacturing equipment, or a component of a manufacturing tool. Semiconductor manufacturing, at times, includes testing lots to determine whether a station will process the lot correctly. For some stations, therefore, a lot is first processed on the station and then the lot is tested after it has been processed. A test lot can be referred to as "send-ahead" lot. Other lots, however, cannot be processed on that particular station requiring a send-ahead lot until the testing of the send-ahead lot is completed.

For example, there are two stations (e.g., Station-1 (409A) and Station-2 (409B)) that can process a number of lots. Station-1 (409A) requires a send-ahead lot to ensure that Station-1 (409A) will process each lot correctly. Station-2 (409B) does not require a send-ahead lot. A first lot is processed on Station-1 (409A) as a send-ahead lot and other lots to be processed on Station-1 (409A) cannot start until the testing of the send-ahead lot is complete. Whereas, lots processed on Station-2 (409B) can be processed without having to wait for a send-ahead lot since a send-ahead lot is not required on Station-2 (409B). A counter constraint 401 can model such a scenario using a counter 411 to track the completion of the testing for the send-ahead lot. For example, lots cannot be processed on Station-1 (409A) unless the value of the counter 411 is greater than or equal to one. The counter 411 can have an initial value of zero. After the testing of the send-ahead lot is complete, the counter 411 can be set to one, whereby other lots can be processed on Station-1 (409A).

A task can provide one lot to be processed on a station and be referred to as a lot-task (e.g., lot-task-1 (403), and lot-task-2 (405) through lot-task-n (407)). The lot-tasks (403, 405, 407) will provide a lot to either Station-1 (409A) or Station-2 (409B). Each lot-task can have a start time ($S_1$, $S_2$, $S_n$) variable to represent the process start time of the lot, an end time ($E_1$, $E_2$, $E_n$) variable to represent the process end time of the lot, and an equipment variable ($EQ_1$, $EQ_2$, $EQ_n$) to represent which station the lot will be processed on. In one embodiment, search variables are assigned Boolean values. For example, where lot-task-1 (403) and lot-task-2 (405) will be processed on Station-1 (409A), the equipment variables ($EQ_1$, $EQ_2$) for lot-task-1 (403) and lot-task-2 (405) can be assigned a TRUE value to indicate that lot-task-1 (403) and lot-task-2 (405) will be processed on the station requiring a send-ahead lot (Station-1). Likewise, where lot-task-n (407) will be processed on Station-2 (409B), the equipment variable ($EQ_n$) for lot-task-n (407) can be assigned a FALSE value to indicate that lot-task-n (407) will be processed on the station that does not require a send-ahead lot (Station-2).

If lot-task-1 (403) is designated to provide the send-ahead lot, a restriction can be created for lot-task-2 (405) through lot-task-n (407) to ensure that any lot to be performed on the station that requires the send-ahead lot is not provided to this station until the send-ahead lot has completed testing. A restriction (421, 423) can be created for each task (405,407), attaching the restriction time ($RT_2$, $RT_n$) to the start time variable ($S_2$, $S_n$) of the corresponding task, such that a lot cannot be provided by tasks (405, 407) unless the counter 411 has a value of greater than or equal to one. Each restriction can include a relational operator ($R_2$, $R_n$) of "greater than or equal to" and a restriction value ($V_2$, $V_n$) of "1." If lot-task-n (407) will provide a lot for Station-2 (409B), and the restriction (423) for lot-task-n (407) will not apply to lot-task-n (407) because a condition ($C1_{En}$) is not met.

Counter constraint 401 can include conditions which define the circumstances of when to apply an update or restriction. One or more conditions can be specified in a restriction in order to turn the restriction "on" or "off." In this example, each restriction can have a condition to turn a restriction "on" (to apply the restriction to a task). The condition ($C1_{E2}$, $C1_{En}$) can specify that the equipment variable ($EQ_2$, $EQ_n$) of a task must have a TRUE value to turn the restriction "on." As described above, the equipment variable ($EQ_n$) for lot-task-n (407) is assigned a FALSE value to indicate that lot-task-n (407) will provide a lot to a station that does not require a send-ahead lot (Station-2). Therefore, in this example, the restriction (423) for lot-task-n (407) is not turned "on" and will not apply to lot-task-n because the condition ($C1_{En}$) for lot-task-n is not met. Lot-task-n (407), therefore, can be processed on Station-2 (409B) without regard to the value of the counter 411.

The equipment variable ($EQ_2$) for lot-task-2 (405), however, has a TRUE value since lot-task-2 will be processed on the station requiring a send-ahead lot (Station-1). The restriction (421) for lot-task-2, therefore, meets the condition ($C1_{E2}$). Thus, lot-task-2 (405) cannot start processing on Station-1 (409A) unless the counter 411 has a value of greater than or equal to one. In this example, lot-task-1 (403) is the send-ahead lot and does not have a restriction since lot-task 1 (403) will provide a lot to Station-1 (409A) regardless of the value of the counter 411.

The counter 411 can have an initial value of zero and therefore, lot-task-2 (405) cannot yet start. An update (413) can be created to set the value of the counter 411 to one after the send-ahead lot (e.g., lot-task-1 (403)) has completed testing. An update can be created having an action ($A_1$) specifying that "five hours after the lot has been provided, the counter is set to one" and an update time ($UT_1$) associated with the task end time ($RT_1$) of lot-task-1. Therefore, five hours after lot-task-1 (403) has been provided, the value of the counter 411 is set to one. Lot-task-2 (405) can then provide a lot to Station-1 (409A).

Figure 5:
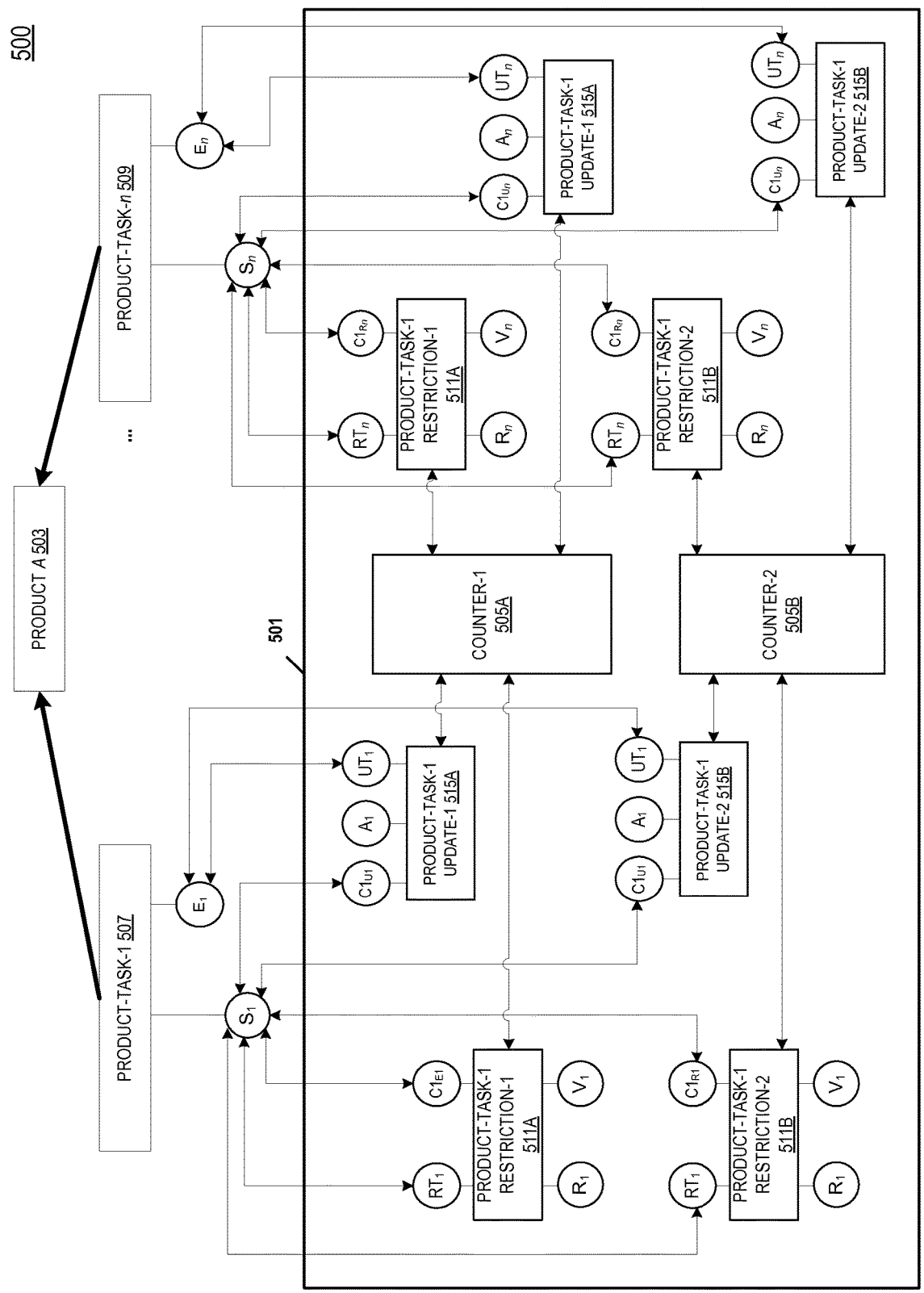
FIG. 5 is a diagram schematically illustrating an example of a scheduling system using a counter constraint having more than one counter for scheduling tasks.

FIG. 5 schematically illustrates an example of a scheduling system 500 using a counter constraint 501 having more than one counter for scheduling tasks, according to one embodiment of the invention. For example, a user may want no more than a quantity of 50 of product A (503) to be manufactured in the first 12 hours of a day (e.g., midnight to noon) and no more than a quantity of 75 of product A (503) to be manufactured in the second 12 hours of the day (e.g., noon to midnight). There are two counters (505A, B). Counter-1 (505A) can track a value corresponding to the first 12 hours of a day (e.g., midnight to noon). Counter-2 (505B) can track a value corresponding to the last 12 hours of a day (e.g., noon to midnight). A counter constraint 501 can model a scenario where a product-task (507, 509) to produce product A can start in the first 12 hours of the day if the value of counter-1 (505A) is less than 50. The counter constraint 501 can also model a scenario where a product-task (507, 509) to produce product A can start in the second 12 hours of the day if the value of counter-1 (505B) is less than 75.

A counter (505A, B) can have an initial value of zero. There can be more than one restriction for each task. Counter constraint 501 uses two restrictions for each product-task. The first restriction (511A, 513A) places a restriction on the start time ($S_1$, $S_n$) of a product-task if the start time of the product-task is planned for the first 12 hours of a day (e.g., midnight to noon). The second restriction (511B, 513B) places a restriction on the start time ($S_1$, $S_n$) of a product-task if the start time of the product-task is planned for the last 12 hours of a day (e.g., noon to midnight). Each restriction for each product-task can include a restriction time ($RT_1$, $RT_n$) which is associated to the start time variable ($S_1$, $S_n$) of the corresponding product-task (507, 509). The first restriction (511A, 513A) for each product-task is associated with counter-1 (505A) and can include a relational operator ($R_1$, $R_n$) of "less than" and a restriction value ($V_1$, $V_n$) of "50," such that each product-task (507, 509) does not start to produce product A (503) unless counter-1 (505A) has a value of less than 50. A condition ($C1_{R1}$, $C1_{Rn}$) can be specified for each restriction-1 (511A, 513A) to turn the restriction-1 "on" if the start time of the corresponding product-task falls in the first 12 hours of a day (e.g., midnight to noon). Therefore, if product-task-1 (507) has a planned start time ($S_1$) of ten o'clock in the morning, the restriction-1 (511A) will require that counter-1 (505A) have a value that is less than 50 before product-task-1 can start to produce product A. However, if product-task-1 (507) has a planned start time ($S_1$) of four o'clock in the afternoon, the restriction-1 (511A) will not be turned on.

The second restriction (511B, 513B) for each product-task can be associated with counter-2 (505B) and can include a relational operator ($R_1$, $R_n$) of "less than" and a restriction value ($V_1$, $V_n$) of "75," such that each product-task (507, 509) does not start to produce product A (503) unless counter-2 (505B) has a value of less than 75. A condition ($C1_{R1}$, $C1_{Rn}$) can be specified for each restriction-2 (511B, 513B) to turn the restriction-2 "on" if the start time of the corresponding product-task falls in the last 12 hours of a day (e.g., noon to midnight). Therefore, if product-task-1 (507) has a planned start time ($S_1$) of seven o'clock in the evening, the restriction-2 (511A) will be turned on and require that counter-2 (505A) have a value that is less than 75 before product-task-1 can start to produce product A. However, if product-task-1 (507) has a planned start time ($S_1$) of eleven o'clock in the morning, the restriction-2 (511A) will not be turned on.

There can be more than one update for each task. Counter constraint 501 uses two updates for each product-task. The first update for each product-task (515A, 517A) can include an action ($A_1$, $A_n$) to describe how the value of counter-1 (505A) is updated. For example, each update-1 can include an action describing that the value of the counter-1 (505A) is incremented by one when a product-task (507, 509) produces product A (503). As such, each update-1 (515A, 517A) includes an update time ($UT_1$, $UT_n$) associated with the end time variable ($E_1$, $E_n$) of its corresponding product-task. A condition ($C1_{U1}$, $C1_{Un}$) can be specified for each update-1 (515A, 517A) to turn the update-1 "on" if the start time of the corresponding product-task falls in the first 12 hours of a day (e.g., midnight to noon). Therefore, if product-task-1 (507) has a planned start time ($S_1$) of seven o'clock in the morning, the update-1 (511A) can increment counter-1 (505A) by one when product-task-1 has finished its production of product A.

The second update for each product-task (515B, 517B) can include an action ($A_1$, $A_n$) describing that the value of the counter-2 (505B) is incremented by one when a product-task (507, 509) produces product A (503). As such, each update-2 (515B, 517B) includes an update time ($UT_1$, $UT_n$) associated with the end time variable ($E_1$, $E_n$) of its corresponding product-task. A condition ($C1_{U1}$, $C1_{Un}$) can be specified for each update-2 (515B, 517B) to turn the update-2 "on" if the start time of the corresponding product-task falls in the last 12 hours of a day (e.g., noon to midnight). Therefore, if product-task-1 (507) has a planned start time ($S_1$) of nine o'clock in the evening, the update-2 (511B) can increment counter-2 (505B) by one when product-task-1 has finished its production of product A.

Figure 6:
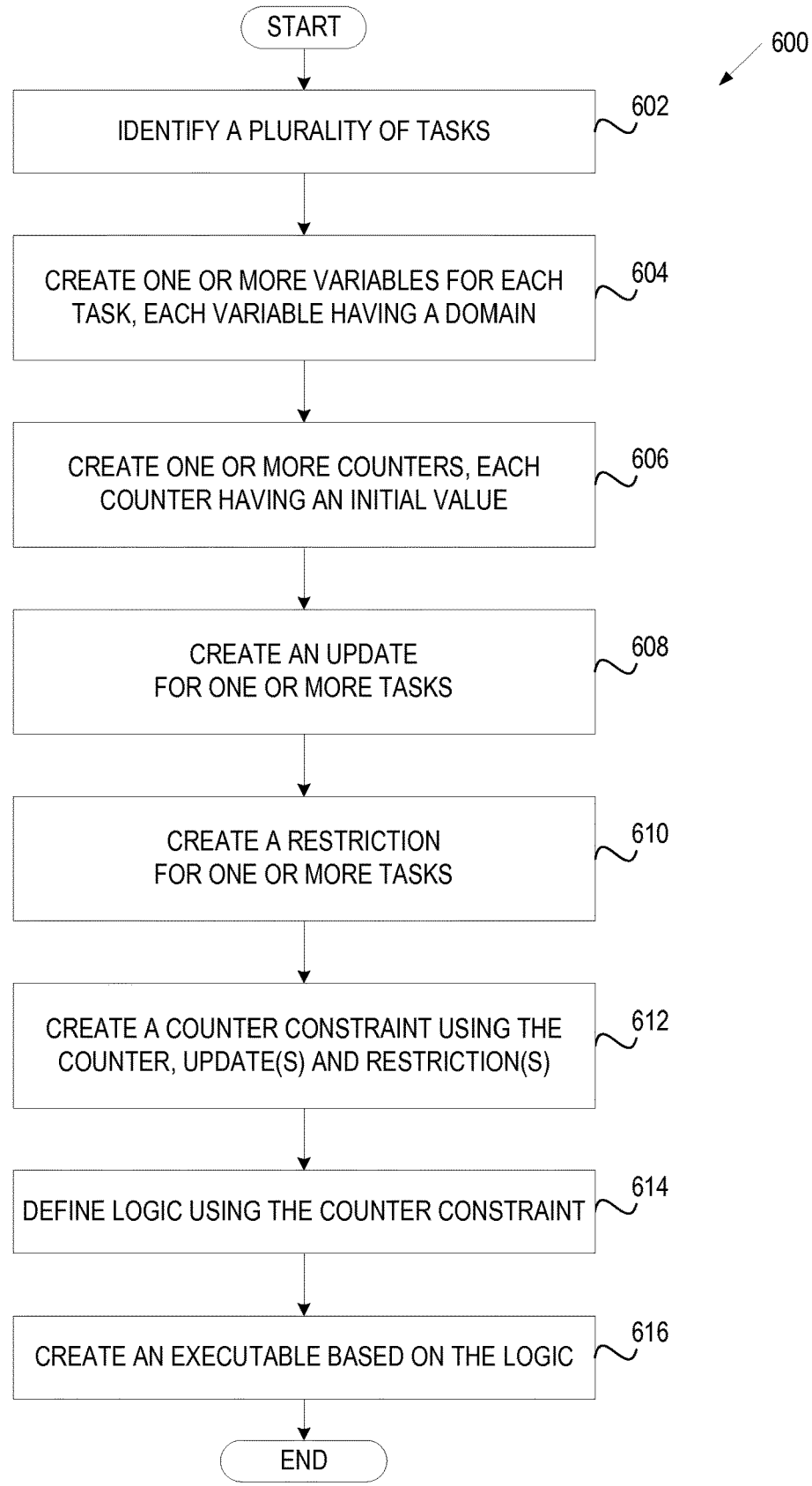
FIG. 6 illustrates one embodiment of a method for generating a counter constraint for scheduling tasks.

FIG. 6 illustrates one embodiment of a method 600 for generating a counter constraint for tracking a value. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by a computer system hosting a counter constraint manager 150 of FIG. 1B.

At block 602, processing logic identifies a plurality of tasks to be performed. A task can be a representation of an action related to the manufacture of a product (e.g., semiconductor). Examples of tasks include a task to represent the use of a resource (e.g., the use of a reticle), a task to represent the inspection of a resource (e.g., inspection of a reticle), a task to represent a lot being processed on a station, a task to represent a particular type of product being manufactured, etc. In one embodiment, the tasks are identified by receiving input from a user (e.g., an industrial engineer) via a user interface (e.g., GUI).

At block 604, processing logic creates one or more variables for each task. Examples of variables include a start time variable, end time variable, send-ahead variable and equipment variable. The start time variable can represent the start time of a task and the end-time variable can represent the end time of a task. A send-ahead variable can represent whether a task representing a lot to be processed is a send-ahead lot. Variables can be assigned Boolean values. For example, if a task represents a send-ahead lot, the send-ahead variable can have a true value. An equipment variable can represent the station capable of performing a task. A domain is created for each variable. A domain sets boundaries for the possible values for each of the variables.

At block 606, processing logic creates one or more counters. A counter can be used as a mechanism to track a value. A counter can represent a quantity (e.g., a number of times a resource has been used, the number of products that have been manufactured, etc.). A counter can have an integer value. Alternatively, a counter can represent time (e.g., time in seconds). A counter can be used as a mechanism to trigger a scheduling action with respect to a task (e.g., a lot cannot be provided to a station requiring a send-ahead lot unless the counter has a value greater than or equal to one). At block 606, the counter is set to an initial value (e.g., zero).

At block 608, processing logic creates an update for one or more tasks. An update affects the value of a counter. An update is created using an action and an update time. In one embodiment, computing environment receives user input (e.g., via a GUI) to create an action and an update time. An action describes how the counter value is updated. For example, an action can set the value of the counter to zero, increment the value of the counter by an amount (e.g., an integer value, for example, 10), and decrement the value of the counter by an amount (e.g., 10). An update time represents when the action to update the counter takes place. An update time can be "tied" to another variable. For example, an update time can be tied to a start time variable of a task (e.g., start time of a use-task), such that the action is not performed on the counter until the start time of the task (e.g., increment the counter value by 1 when a task begins to use a reticle). In another example, an update is tied to an end-time of a task (e.g., end-time of the inspection task), such that the action is not performed on the counter until the end-time of the task (e.g., reset the counter to zero after the reticle has been inspected). In another embodiment, an update time is not tied to another variable, but can be a time specified by a user via a GUI. For example, an industrial engineer can specify that the counter value is set (reset) to zero at midnight.

There can be an update for each task. For example, there can be an update for an inspection task to reset the counter value to zero after the reticle has been inspected and an update for each use-task to increment the counter value by one when a task uses the reticle. In another embodiment, however, an update may not be created for each task. For example, a task can be defined to inspect a reticle every 24 hours, rather than based on the number of times the reticle has been used. A counter can be used as a timer where the counter value is based on time. The counter can have an initial value of zero, where with every second that passes, the counter value can be incremented by one second. In this example, each use-task does not have an update to increment the counter by one since the counter is being incremented based on time. There is an update only for the inspection-task to reset the counter after the reticle has been inspected.

An update can also have zero or more conditions. At block 608, processing logic can specify conditions for an update to define when to turn an update "on." In the previous example, where a lot can be provided to a station requiring a send-ahead lot or a station that does not require a send-ahead lot, an update was created for each task. A condition was specified to turn the update "on" if the task provided a send-ahead lot such that the counter would be updated (e.g., set the counter to one) five hours after the send-ahead lot was provided. In this example, the update was not turned "on" for any task that did not provide the send-ahead lot.

At block 610, processing logic creates a restriction for one or more tasks. A restriction places a dependency on the scheduling of tasks using the counter value. A restriction can be a general restriction (e.g., at three o'clock in the afternoon the counter must have a value of less than 52). A restriction can also be task-specific (e.g., an inspection-task can only be performed if the counter value is greater than 10). A restriction is created using a relational operator, value and a restriction time. In one embodiment, computing environment receives user input (e.g., via a GUI) to create a relational operator, value and restriction time. A restriction places a restriction in scheduling tasks by using a counter value, relational operator and restriction value. Examples of relational operations include greater than, less than, equal to, greater than or equal to, less than or equal to, etc. A restriction value can represent a quantity and be expressed as an integer value. A restriction value can represent time and be expressed in seconds.

A restriction time represents when the restriction is applied. A restriction time can be "tied" to another variable. For example, a restriction time can be tied to a start time variable of a task (e.g., start time of a use-task), such that the restriction is applied at the start-time of the task (e.g., the task cannot start to use the reticle unless the counter is less than 10). This example has a relational operator of "less than," a restriction value "10," and restriction time "tied" to the start time variable of the use-task. In another embodiment, a restriction time is not tied to another variable, but can be a time specified by a user (e.g., via a GUI). For example, an industrial engineer can specify that at three o'clock in the afternoon, the counter must have a value less than 52.

A restriction can also have zero or more conditions. At block 610, processing logic can specify one or more conditions to define when to turn a restriction "on." In the previous example, where a lot can be processed on a station requiring a send-ahead lot or on a station that does not require a send-ahead lot, an update was created for each task. A condition was specified to turn a restriction "on" if the task provided a lot to be processed on a station requiring a send-ahead lot. If the task did provide a lot to be processed on the station requiring a send-ahead lot, the restriction would be turned "on" such that the task could not start unless the counter had a value of greater than or equal to one. In this example, the restriction was not turned "on" for any task that provided a lot to be processed on a station that did not require a send-ahead lot.

In some embodiments, processing logic specifies that domain variables should be updated to ensure that the constraint is satisfied. For example, the constraint may require that none of the tasks producing a product be performed if the counter has a value of greater than or equal to x (e.g., '52' as discussed above in conjunction with FIG. 2), and the search variables' domains of the tasks should be updated to reflect this.

At block 612, processing logic creates a counter constraint using the counter, updates and restrictions. At block 614, processing logic defines logic using the plurality of variables, domains, counter, updates, restrictions and counter constraint. At block 616, processing logic creates an executable based on the logic.

Figure 7:
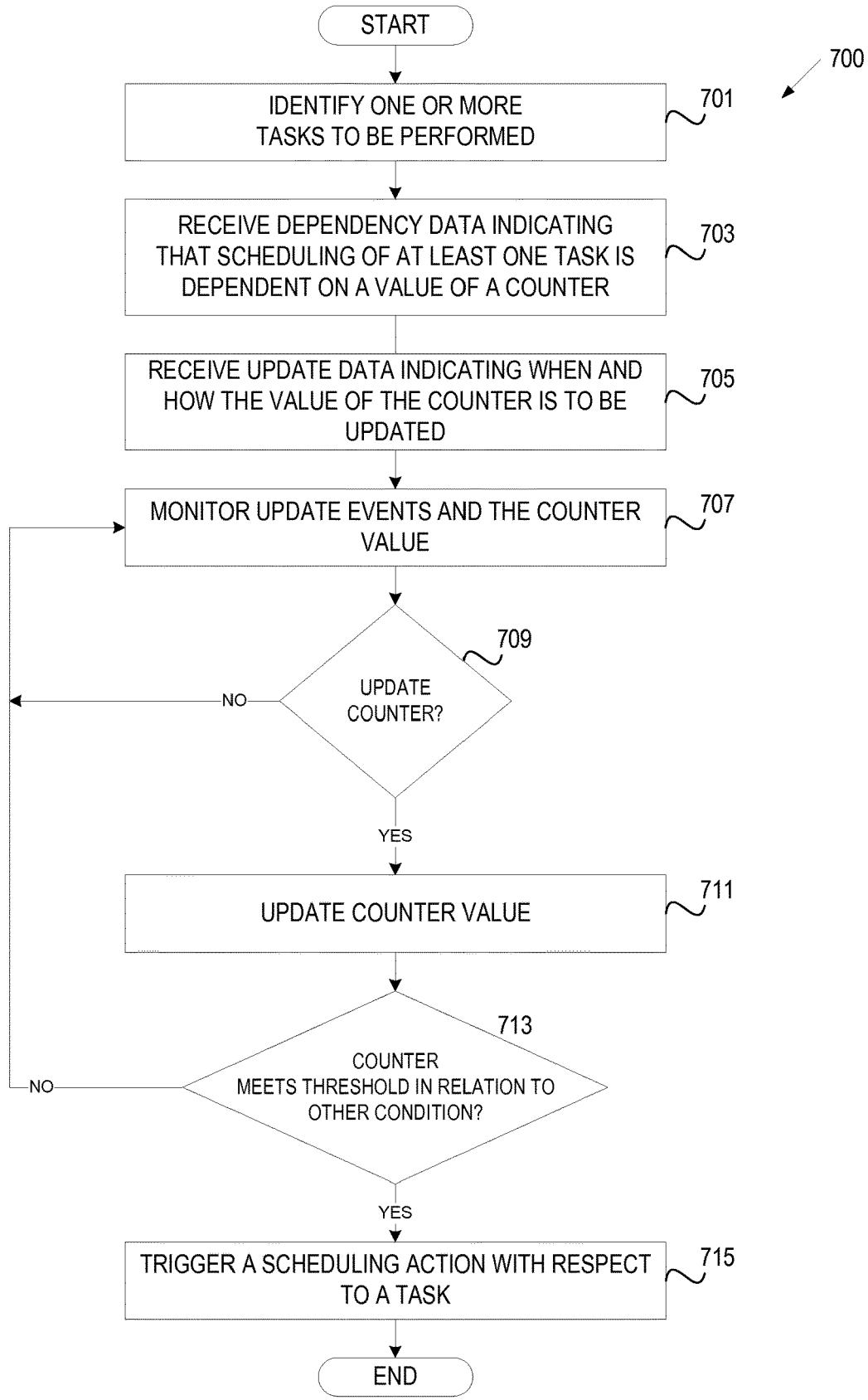
FIG. 7 illustrates one embodiment of a method for scheduling tasks using a counter constraint.

FIG. 7 illustrates one embodiment of a method 700 for scheduling tasks using a counter. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a computer system hosting a counter constraint manager 150 in FIG. 1B.

In one embodiment, a counter constraint has been built using a representation for one or more tasks (e.g., product-task-1, inspection-task, use-task-1, lot-task-1, etc.), variables and domains for each task, a counter, a set of updates, a set of restrictions and conditions. At block 701, processing logic identifies one or more tasks to be performed. Examples of tasks include the use of a resource (e.g., the use of a reticle), the inspection of a resource (e.g., inspection of a reticle), a lot being processed on a station, a particular type of product being manufactured. In one embodiment, the tasks are identified by receiving input from a user (e.g., an industrial engineer) via a GUI.

At block 703, processing logic receives dependency data indicating that scheduling of a task is dependent on whether the counter meets a threshold in relation to an addition condition (e.g., at a specific state of a task, at a specified time, etc.). For example, processing logic can receive data from a user who schedules the manufacture of a semiconductor product, indicating that the reticle tool must be inspected after the reticle has been used for 24 hours before the reticle tool can further be used in the manufacturing of the semiconductor product. In this example, the start time of the inspection task is dependent on a counter having a value of greater than or equal to 24 hours in relation to the reticle tool. In another example, for a task of inspecting a reticle after the reticle has been used 10 times, the start time of the inspection task is dependent on a counter value equal to 10, and for a task that uses the reticle, the start time of the task is dependent on the counter having a value of less than 10. In one embodiment, processing logic generates and displays a GUI to receive the dependency data from a user (e.g., an industrial engineer). In one embodiment, processing logic stores the dependency data in a data store.

At block 705, processing logic receives update data indicating when and how to update the value of the counter. The update data can indicate a value. For example, the update data can specify to set the value of the counter to zero, increment the value of the counter by an integer value (e.g., one), and decrement the value of the counter by ten. The update data can also indicate an event that should cause an update of the value of the counter. For example, for a schedule requiring a reticle tool to be inspected after the reticle has been used 10 times, the update data can indicate that the counter is updated (e.g., incremented by one) after each use of the reticle. In one embodiment, the update data is received from a user (e.g., an industrial engineer) via a GUI. In one embodiment, processing logic stores the update data in a data store.

At block 707, processing logic initiates execution of tasks and begins monitoring update events and the value of the counter. At block 709, processing logic makes a determination as to whether to update the value of the counter based on the received data (whether a counter update event is detected) (block 709). The counter can have an initial value (e.g., zero). Using the example above, processing logic can increment the counter by one after each use of the reticle. If processing logic determines to not update the counter (block 709), processing logic returns to block 707, otherwise the counter is updated at block 711.

At block 713, processing logic determines whether the counter value meets a threshold in relation to an additional condition (e.g., a specific time is reached, a specific change io a tasj state has occurred, etc.). In the above example, where the reticle is inspected after the reticle has been used ten times, processing logic can determine whether the counter has a value equal to ten after the completion of a use-task. If not, processing logic continues to monitor the counter at block 707. If so, processing logic triggers a scheduling action with respect to a task at block 715. For example, processing logic causes the reticle to be inspected.

Figure 8:
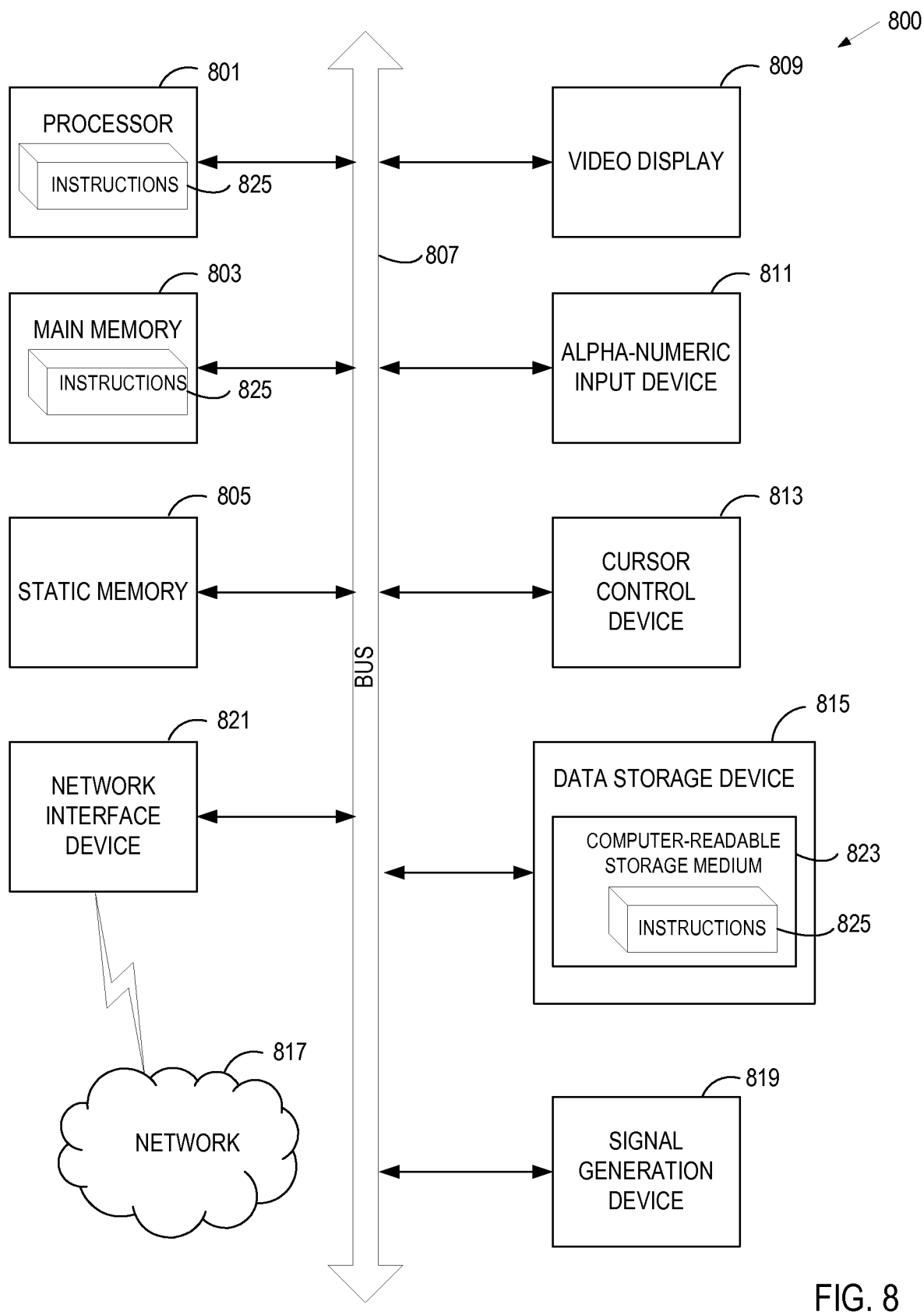
FIG. 8 illustrates an exemplary computer system executing embodiments of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 801, a main memory 803 (e.g., read-only memory (ROM), flash memory, dynamic random access memory (DRAM) such as synchronous DRAM (SDRAM) or Rambus DRAM (RDRAM), etc.), a static memory 805 (e.g., flash memory, static random access memory (SRAM), etc.), and a data storage device 815 (e.g., drive unit), which communicate with each other via a bus 807.

Processor 801 represents one or more general-purpose processing devices such as a microprocessor, central processing unit, or the like. More particularly, the processor 801 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 801 may also be one or more special-purpose processing devices such as an application specific integrated circuit (ASIC), a field programmable gate array (FPGA), a digital signal processor (DSP), network processor, or the like. The processor 801 is configured to execute the instructions 825 for performing the operations and steps discussed herein.

The computer system 800 may further include a network interface device 821. The computer system 800 also may include a video display unit 809 (e.g., a liquid crystal display (LCD) or a cathode ray tube (CRT)), an alphanumeric input device 811 (e.g., a keyboard), a cursor control device 813 (e.g., a mouse), and a signal generation device 819 (e.g., a speaker).

The data storage device 815 may include a computer-readable storage medium 823 on which is stored one or more sets of instructions 825 (e.g., software) embodying any one or more of the methodologies or functions described herein. The instructions 825 may also reside, completely or at least partially, within the main memory 803 and/or within the processor 801 during execution thereof by the computer system 800, the main memory 803 and the processor 801 also constituting computer-readable storage media. The instructions 825 may further be transmitted or received over a network 817 via the network interface device 821.

The computer-readable storage medium 823 may also be used to store data structure sets that define user identifying states and user preferences that define user profiles. Data structure sets and user profiles may also be stored in other sections of computer system 800, such as static memory 805.

While the computer-readable storage medium 823 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies for embodiments of the present invention. The term "computer-readable storage medium" shall accordingly be taken to include, but not be limited to, solid-state memories and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "receiving," "monitoring," "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relates to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A machine-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

It is to be understood that the above description is intended to be illustrative, and not restrictive. Many other embodiments will be apparent to those of skill in the art upon reading and understanding the above description.

What is claimed is:

1. A computer-implemented method for manufacturing semiconductor products comprising:
providing a first task by a scheduling system executed on a computing device, to a dispatcher executed on the computing device, the first task comprising providing a semiconductor wafer to a first semiconductor equipment station and processing the semiconductor wafer on the first semiconductor equipment station to produce a first semiconductor product, a variable comprising a start time, and a domain comprising a range of allowed values of the variable;
receiving, by the scheduling system of the computing device, lot status data and equipment status data from a manufacturing execution system (MES);
creating a counter constraint for a second task, by the scheduling system of the computing device, the counter constraint comprising a counter having an initial value set to track a completion of the second task, that the first semiconductor equipment station correctly produced the first semiconductor product based on the received lot status data, wherein testing is performed at a second semiconductor equipment station and the counter constraint evaluates when to electively utilize the first semiconductor equipment station for manufacturing the semiconductor products;

creating an update, by the scheduling system of the computing device, to change the initial value of the counter from a first value to a second value when the first task is completed and an update time indicating when an action to update the counter takes place has a value less than a threshold in relation to a first restriction for the first task, and applying the first restriction for the first task and pausing resumption of semiconductor manufacturing at the first semiconductor equipment station, the first restriction comprising a limitation imposed on the counter;

triggering a scheduling action, by the scheduling system of the computing device, to execute the first task in the first semiconductor equipment station based on the counter constraint to process the semiconductor wafer on the first semiconductor equipment station at the start time;

executing the first restriction, by the scheduling system of the computing device, to trigger a pause in processing on the first semiconductor equipment station based on the initial value of the counter, such that the value of the counter is compared to the threshold at the start time of the first task and the value of the counter is greater than or equals the threshold of the first restriction;

monitoring, by a counter updator executed by the scheduling system of the computing device, events on the first semiconductor equipment station and the second semiconductor equipment station to determine when the value of the counter is updated to the second value; and triggering resumption of the first task, by the scheduling system of the computing device, once the second value of the counter is reached by receiving completion of the testing, the resumption of the first task comprising resuming semiconductor manufacturing and processing a second semiconductor wafer on the first semiconductor equipment station based on the second value of the counter.

2. The method of claim 1 further comprising:
receiving update data for changing the value of the counter;
determining that the counter value is to be updated; and
updating the counter value based on the update data.

3. The method of claim 2 wherein the update data comprises an indication of how to change the counter value, and an update event indicating when to change the counter value.

4. The method of claim 1 wherein the first task further comprises dependency data indicating that scheduling of the first task is dependent on a variable external to the first task.

5. The method of claim 4 wherein the dependency data indicates that the scheduling of the first task is dependent on the counter.

6. The method of claim 1 further comprising a counter update configured to update the value of the counter by one of increment, decrement, and reset.

7. A control system for a semiconductor processing facility comprising:

a memory comprising computer readable instructions; and a processor, coupled to the memory, to receive the computer readable instructions, and to cause the control system to:

provide a first task by a scheduling system executed on a computing device, to a dispatcher executed on the computing device, the first task comprising providing a semiconductor wafer to a first semiconductor equipment station and processing the semiconductor wafer on the first semiconductor equipment station to produce a first semiconductor product, a variable comprising a start time, and a domain comprising a range of allowed values of the variable;

receive, by the scheduling system of the computing device, lot status data and equipment status data from a manufacturing execution system (MES);

create a counter constraint for a second task, by the scheduling system of the computing device, the counter constraint comprising a counter having an initial value set to track a completion of the second task, that the first semiconductor equipment station correctly produced the first semiconductor product based on the received lot status data, wherein testing is performed at a second semiconductor equipment station and the counter constraint evaluates when to electively utilize the first semiconductor equipment station for manufacturing the semiconductor products;

create an update, by the scheduling system of the computing device, to change the initial value of the counter from a first value to a second value when the first task is completed and an update time indicating when an action to update the counter takes place has a value less than a threshold in relation to a first restriction for the first task, and applying the first restriction for the first task and pausing resumption of semiconductor manufacturing at the first semiconductor equipment station, the first restriction comprising a limitation imposed on the counter;

trigger a scheduling action, by the scheduling system of the computing device, to execute the first task in the first semiconductor equipment station based on the counter constraint to process the semiconductor wafer on the first semiconductor equipment station at the start time;

execute the first restriction, by the scheduling system of the computing device, to trigger a pause in processing on the first semiconductor equipment station based on the initial value of the counter, such that the value of the counter is compared to the threshold at the start time of the first task and the value of the counter is greater than or equals the threshold of the first restriction;

monitor, by a counter updator executed by the scheduling system of the computing device, events on the first semiconductor equipment station and the second semiconductor equipment station to determine when the value of the counter is updated to the second value; and trigger resumption of the first task, by the scheduling system of the computing device, once the second value of the counter is reached by receiving completion of the testing, the resumption of the first task comprising resuming semiconductor manufacturing and processing a second semiconductor wafer on the first semiconductor equipment station based on the second value of the counter.

8. The control system of claim 7 wherein the processor is to further cause the control system to:

receive update data for changing the counter value of the counter;

determine that the counter value is to be updated; and update the counter value based on the update data.

9. The control system of claim 7 wherein the first task further comprises dependency data indicating that scheduling of the first task is dependent on a variable external to the first task.

10. The control system of claim 9 wherein the dependency data indicates that the scheduling of the first task is dependent on the counter.

11. The control system of claim 7 further wherein the update is configured to update the value of the counter by one of increment, decrement, and reset.

12. The control system of claim 11 wherein the counter update is configured to indicate an event in one of the second semiconductor equipment station and the semiconductor processing facility, the indication to cause the counter update to update the value of the counter.

13. The control system of claim 12 wherein:
each update includes an update action parameter, an update time parameter and zero or more update condition parameters; and
each restriction includes a restriction value parameter, a restriction time parameter and zero or more restriction condition parameters.

14. The control system of claim 7, further comprising:
a factory system data source that receives status data from the first semiconductor equipment station and the second semiconductor equipment station.

15. A non-transitory computer readable storage medium including instructions that, when executed by a processing system, cause the processing system to perform a method for manufacturing of semiconductor products, the method comprising:
providing a first task by a scheduling system executed on a computing device, to a dispatcher executed on the computing device, the first task comprising providing a semiconductor wafer to a first semiconductor equipment station and processing the semiconductor wafer on the first semiconductor equipment station to produce a first semiconductor product, a variable comprising a start time, and a domain comprising a range of allowed values of the variable;
receiving, by the scheduling system of the computing device, lot status data and equipment status data from a manufacturing execution system (MES);
creating a counter constraint for a second task, by the scheduling system of the computing device, the counter constraint comprising a counter having an initial value set to track a completion of the second task, that the first semiconductor equipment station correctly produced the first semiconductor product based on the received lot status data, wherein testing is performed at a second semiconductor equipment station and the counter constraint evaluates when to electively utilize the first semiconductor equipment station for manufacturing the semiconductor products;
creating an update, by the scheduling system of the computing device, to change the initial value of the counter from a first value to a second value when the first task is completed and an update time indicating when an action to update the counter takes place has a value less than a threshold in relation to a first restriction for the first task, and applying the first restriction for the first task and pausing resumption of semiconductor manufacturing at the first semiconductor equipment station, the first restriction comprising a limitation imposed on the counter;
triggering a scheduling action, by the scheduling system of the computing device, to execute the first task in the first semiconductor equipment station based on the counter constraint to process the semiconductor wafer on the first semiconductor equipment station at the start time;
executing the first restriction, by the scheduling system of the computing device, to trigger a pause in processing on the first semiconductor equipment station based on the initial value of the counter, such that the value of the counter is compared to the threshold at the start time of the first task and the value of the counter is greater than or equals the threshold of the first restriction;
monitoring, by a counter updator executed by the scheduling system of the computing device, events on the first semiconductor equipment station and the second semiconductor equipment station to determine when the value of the counter is updated to the second value; and
triggering resumption of the first task, by the scheduling system of the computing device, once the second value of the counter is reached by receiving completion of the testing, the resumption of the first task comprising resuming semiconductor manufacturing and processing a second semiconductor wafer on the first semiconductor equipment station based on the second value of the counter.

16. The non-transitory computer readable storage medium of claim 15 wherein the method further comprises:
receiving update data for changing the counter value of the counter;
determining that the counter value is to be updated; and
updating the counter value based on the update data.

17. The non-transitory computer readable storage medium of claim 15 wherein the first task further comprises dependency data indicating that scheduling of the first task is dependent on a variable external to the first task.

18. The non-transitory computer readable storage medium of claim 17 wherein the dependency data indicates that the scheduling of the first task is dependent on the counter.

19. The non-transitory computer readable storage medium of claim 15 wherein the update is configured to update the value of the counter by one of increment, decrement, and reset.

20. The non-transitory computer readable storage medium of claim 19 wherein the counter update is configured to indicate an event in one of the second semiconductor equipment station and a semiconductor processing facility comprising the second semiconductor equipment station, the indication to cause the counter update to update the value of the counter.

* * * * *